United States Patent
Todd (10) Patent No.: US 11,038,690 B2
(45) Date of Patent: Jun. 15, 2021

(54) POLICY-DRIVEN DYNAMIC CONSENSUS PROTOCOL SELECTION

(71) Applicant: EMC IP Holding Company LLC, Hopkinton, MA (US)

(72) Inventor: Stephen J. Todd, Center Conway, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 186 days.

(21) Appl. No.: 16/151,460

(22) Filed: Oct. 4, 2018

(65) Prior Publication Data
US 2020/0112443 A1 Apr. 9, 2020

(51) Int. Cl.
*H04L 9/32* (2006.01)
*H04L 9/06* (2006.01)
*H04L 9/14* (2006.01)
*G06F 16/27* (2019.01)

(52) U.S. Cl.
CPC .......... *H04L 9/3236* (2013.01); *G06F 16/27* (2019.01); *H04L 9/0637* (2013.01); *H04L 9/14* (2013.01); *H04L 9/3255* (2013.01); *H04L 2209/38* (2013.01)

(58) Field of Classification Search
CPC ....... G06F 16/27; G06F 21/64; H04L 9/0637; H04L 9/14–16; H04L 9/3236; H04L 9/3239; H04L 9/3255; H04L 63/00; H04L 2209/38; H04L 2209/56
See application file for complete search history.

(56) References Cited

U.S. PATENT DOCUMENTS

| 2004/0088522 A1* | 5/2004 | Watson, Jr. ............. G06F 15/80 712/11 |
| 2019/0036828 A1* | 1/2019 | Bajaj ................... H04L 41/5009 |
| 2019/0238525 A1* | 8/2019 | Padmanabhan ....... H04L 9/3236 |

OTHER PUBLICATIONS

J. Liu et al., "Scalable Byzantine Consensus via Hardware-Assisted Secret Sharing," arXiv:1612.04997v4, Jul. 27, 2018, 14 pages.
Satoshi Nakamoto, "Bitcoin: A Peer-to-Peer Electronic Cash System," http://bitcoin.org/bitcoin.pdf, 2008, 9 pages.

* cited by examiner

*Primary Examiner* — Kevin Bechtel
(74) *Attorney, Agent, or Firm* — Ryan, Mason & Lewis, LLP (57) ABSTRACT

A method obtains one or more transactions to be validated by a set of consensus nodes before storage on a digital ledger, and then selects, from a plurality of consensus algorithms, a consensus algorithm to be executed by the set of consensus nodes on the one or more transactions. The consensus algorithm selection is made based on a given policy associated with the one or more transactions. The method then tags the one or more transactions to identify the selected consensus algorithm, and sends the one or more tagged transactions to the set of consensus nodes for execution of the selected consensus algorithm for validation of the one or more transactions before storage on the digital ledger. The selection step is repeated when one or more additional transactions are obtained.

20 Claims, 6 Drawing Sheets

POLICY-DRIVEN DYNAMIC CONSENSUS PROTOCOL SELECTION

FIELD

The field relates generally to information processing systems, and more particularly to techniques for secure data management in such information processing systems.

BACKGROUND

A blockchain or digital ledger is a secure data management structure implemented via a distributed, decentralized computer network of operatively coupled compute nodes. Typically, each compute node is configured to maintain the blockchain as a cryptographically secured record of data blocks that represent transactions within a given computational environment. For example, in some implementations, each data block in the blockchain represents a given set of transaction data plus a set of all previous transaction data.

In blockchain and other digital ledger technologies, an underlying consensus protocol is typically used to validate new transactions before they are added to the system. Typically, for example, a new transaction entry is broadcast to all compute nodes within the network. The new transaction entry is inspected, a consensus algorithm is executed, and the entry is formally committed to the blockchain when consensus is reached that the entry is valid.

SUMMARY

Embodiments of the invention provide techniques for policy-driven dynamic consensus protocol selection in a digital ledger environment.

For example, in one or more illustrative embodiments, a method comprises the following steps. The method obtains one or more transactions to be validated by a set of consensus nodes before storage on a digital ledger, and then selects, from a plurality of consensus algorithms, a consensus algorithm to be executed by the set of consensus nodes on the one or more transactions. The consensus algorithm selection is made based on a given policy associated with the one or more transactions. The method then tags the one or more transactions to identify the selected consensus algorithm, and sends the one or more tagged transactions to the set of consensus nodes for execution of the selected consensus algorithm for validation of the one or more transactions before storage on the digital ledger. The selection step is repeated when one or more additional transactions are obtained.

Advantageously, illustrative embodiments provide dynamic per-transaction consensus algorithm (also referred to herein as consensus protocol) selection in a digital ledger environment.

These and other features and advantages of the invention will become more readily apparent from the accompanying drawings and the following detailed description.

2

DETAILED DESCRIPTION

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system.

On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid clouds) with a vast array of computing resources attached to or otherwise a part of such IT infrastructure.

Secure data management structures, such as blockchains or digital ledgers, as will be described herein may be implemented in information processing systems that comprise cloud computing platforms in some embodiments, non-cloud computing platforms in other embodiments, and combinations thereof in yet other embodiments.

Illustrative embodiments provide techniques for policy-driven dynamic consensus protocol selection in an information processing system comprising a plurality of compute nodes also referred to as computing resources. The term "computing resource," as illustratively used herein, can refer to any device, endpoint, component, element, or other resource, that is capable of performing processing and/or storage functions and is capable of communicating with the system. Non-limiting examples of such computing resources include employee mobile devices, customer mobile devices, lap tops, vehicles (e.g., drones, planes, cars, trucks, other shipping transports, etc.), Internet of Things (IoT) devices (e.g., sensors, tags, other monitoring or display systems, etc.), etc.

Before describing policy-driven dynamic consensus protocol selection according to illustrative embodiments, illustrative features of blockchain technology will first be described below.

As used herein, the terms "blockchain," "digital ledger" and "blockchain digital ledger" may be used interchangeably. As mentioned above, the blockchain or digital ledger protocol is implemented via a distributed, decentralized computer network of compute nodes (computing resources). The compute nodes are operatively coupled in a peer-to-peer communications protocol. In the computer network, each compute node is configured to maintain a blockchain which is a cryptographically secured record or ledger of data blocks that represent respective transactions within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data. In existing digital ledger technologies such as blockchain, an underlying consensus algorithm is typically used to validate new transactions before they are added to the digital ledger. Typically, for example, the new transaction entry is broadcast to all nodes within the network and inspected, a consensus is reached, and the entry is formally committed to the blockchain when consensus is reached that the entry is valid.

In the case of a "bitcoin" type implementation of a blockchain distributed ledger, the blockchain contains a record of all previous transactions that have occurred in the bitcoin network. The bitcoin system was first described in S. Nakamoto, "Bitcoin: A Peer to Peer Electronic Cash System," 2008, the disclosure of which is incorporated by reference herein in its entirety.

A key principle of the blockchain is that it is trusted. That is, it is critical to know that data in the blockchain has not been tampered with by any of the compute nodes in the computer network (or any other node or party). For this reason, a cryptographic hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners.

It is to be appreciated that the above description represents an illustrative implementation of the blockchain protocol and that embodiments are not limited to the above or any particular blockchain protocol implementation. As such, other appropriate processes may be used to securely maintain and add to a set of data in accordance with embodiments of the invention. For example, distributed ledgers such as, but not limited to, R3 Corda, Ethereum, and Hyperledger may be employed in alternative embodiments.

Figure 1:
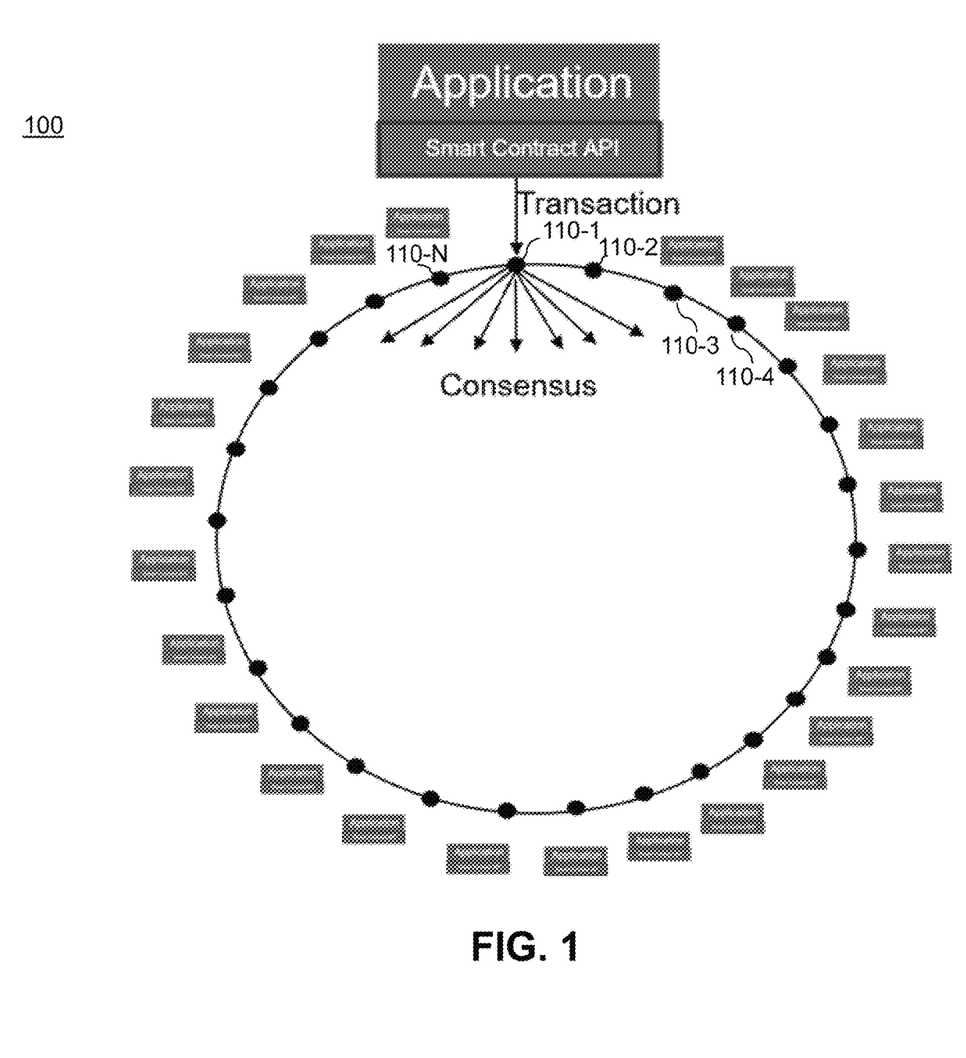
FIG. 1 illustrates consensus broadcasting from a given consensus node to other consensus nodes for a new transaction in a digital ledger system with which one or more illustrative embodiments are implemented.

FIG. 1 illustrates consensus broadcasting from a given compute node (also referred to herein as a "consensus node") to other compute nodes (consensus nodes) in a consensus network 100 for a new transaction in a blockchain system with which one or more illustrative embodiments are implemented. More particularly, as shown, consensus network 100 comprises a plurality of consensus nodes 110-1 through 110-N.

As illustratively depicted in FIG. 1, each consensus node has an application program ("Application") and an application programming interface ("Smart Contract API") associated therewith. However, it is to be appreciated that in alternative embodiments a given application using one or more APIs could have more than one consensus node associated therewith, and/or a given consensus node could have more than one application associated therewith. An application program accesses the corresponding consensus node through the API to input or otherwise access transactions (e.g., messages as described above) on the blockchain stored on the consensus node. The term "smart contract" is a reference to the nature of a blockchain transaction requiring consensus prior to being added to the digital ledger, i.e., a digital agreement with characteristics of immutability and enforceability.

Thus, FIG. 1 highlights a transaction being inserted by consensus node 110-1 into the consensus network 100. This transaction is broadcast to the entire network of consensus nodes, i.e., consensus nodes 110-2 through 110-N, and the entire network then inter-communicates (often using all-to-all messaging) to validate the transaction before the transaction is committed to the blockchain. As mentioned, such validation is performed using a consensus algorithm or protocol. That is, the new transaction is broadcast to all consensus nodes within the network 100 and inspected, a consensus is reached between the consensus nodes, and the entry is formally committed to the blockchain when consensus is reached that the entry is valid.

Note that in some typical consensus protocols, consensus nodes are each configured to participate as peers with one peer being designated as a leader. Any peer can assume the role of leader for a given iteration of the consensus protocol. Typically, the leader node sends out a new transaction to one or more of the other peer nodes which each validate the accuracy of the new transaction. If consensus is reached, then the nodes in the network add the new block to the blockchain they currently maintain. As a result, after the new transaction is processed by the consensus network, each node should now have a copy of the same updated blockchain stored in its memory. Then, when a new transaction comes into the network, the above-described process of adding the transaction to the blockchain is repeated. In the context of a consensus protocol, the more nodes that validate the given transaction, the more trustworthy the data block is considered.

Blockchain consensus algorithms have evolved over time. Each consensus algorithm has advantages and disadvantages. Unfortunately, a given consensus algorithm is typically statically built-in to a blockchain implementation, forcing applications that utilize the blockchain implementation to suffer in perpetuity with the disadvantages of the given consensus algorithm.

Since the introduction of bitcoin in 2008, blockchain implementations have used consensus algorithms to validate ledger transactions. The evolution has included "proof-of-work," "proof-of-stake," and "Byzantine Fault Tolerance (BFT)" consensus algorithms. In a proof-of-work consensus algorithm, mining depends on how much computing power a compute node has, while in a proof-of-stake consensus algorithm, mining depends on how much stake (e.g., cryptocurrency) the compute node has. Thus, while both proof-of-work and proof-of-stake algorithms are considered capital-intensive, proof-of-stake has environmental advantages, e.g., it is less compute-intensive.

A BFT algorithm is a consensus algorithm that is based on the so-called "Byzantine Generals Problem" and attempts to achieve a consensus across a distributed network of compute nodes, some of which could be potentially faulty, while also accounting for the fact that attackers may be attempting to undermine the network. BFT algorithms have cost advantages (e.g., less compute resources, no need to purchase a stake), but scale disadvantages (e.g., BFT systems become unusable at the scale offered by bitcoin's blockchain).

An improved BFT based consensus algorithm is called a Scalable BFT (SBFT) algorithm. SBFT has remarkable performance and scalability advantages (due to optimized messaging), but it is also designed for permissioned environments and therefore cannot be leveraged by applications desiring to participate in public blockchain ecosystems.

Thus, in summary, proof-of-work algorithms are public and scalable but are opened and capital-intensive, proof-of-stake algorithms are public, scalable and less compute-intensive than proof-of-work algorithms but also are still opened and capital-intensive. BFT algorithms are faster and use less compute resources than the other two algorithms, but are not efficiently scalable and resilient. SBFT algorithms are faster, less compute-intensive, scalable and resilient, but are permissioned (not opened).

Applications wishing to benefit from the advantages of different consensus algorithms currently have to choose one of them and stick with it. This causes a number of problems which are outlined below.

Consensus Lock-In.

The above-described static selection dilemma faced by an application is typically solved by committing to the "best fit" consensus algorithm for the application's requirements. For example, an application may choose proof-of-stake to keep compute costs down and scale to a large number of compute nodes. However, once the application chooses proof-of-stake, the application has no option to dynamically move away from that approach.

No Ability to Monitor Consensus SLAs.

Once an application commits to a consensus algorithm based on "best-fit" requirements (e.g., specified by a service level agreement or SLA), there is no existing mechanism to evaluate whether or not the consensus algorithm is meeting the application objectives, nor is there any existing method to determine how much of a penalty the application is paying for choosing a consensus algorithm that performs poorly against a given requirement. In other words, not only is the application locked into a consensus algorithm, it also has little to no way of knowing whether or not the choice it made was the right one.

Multi-Ledger Management.

Figure 2:
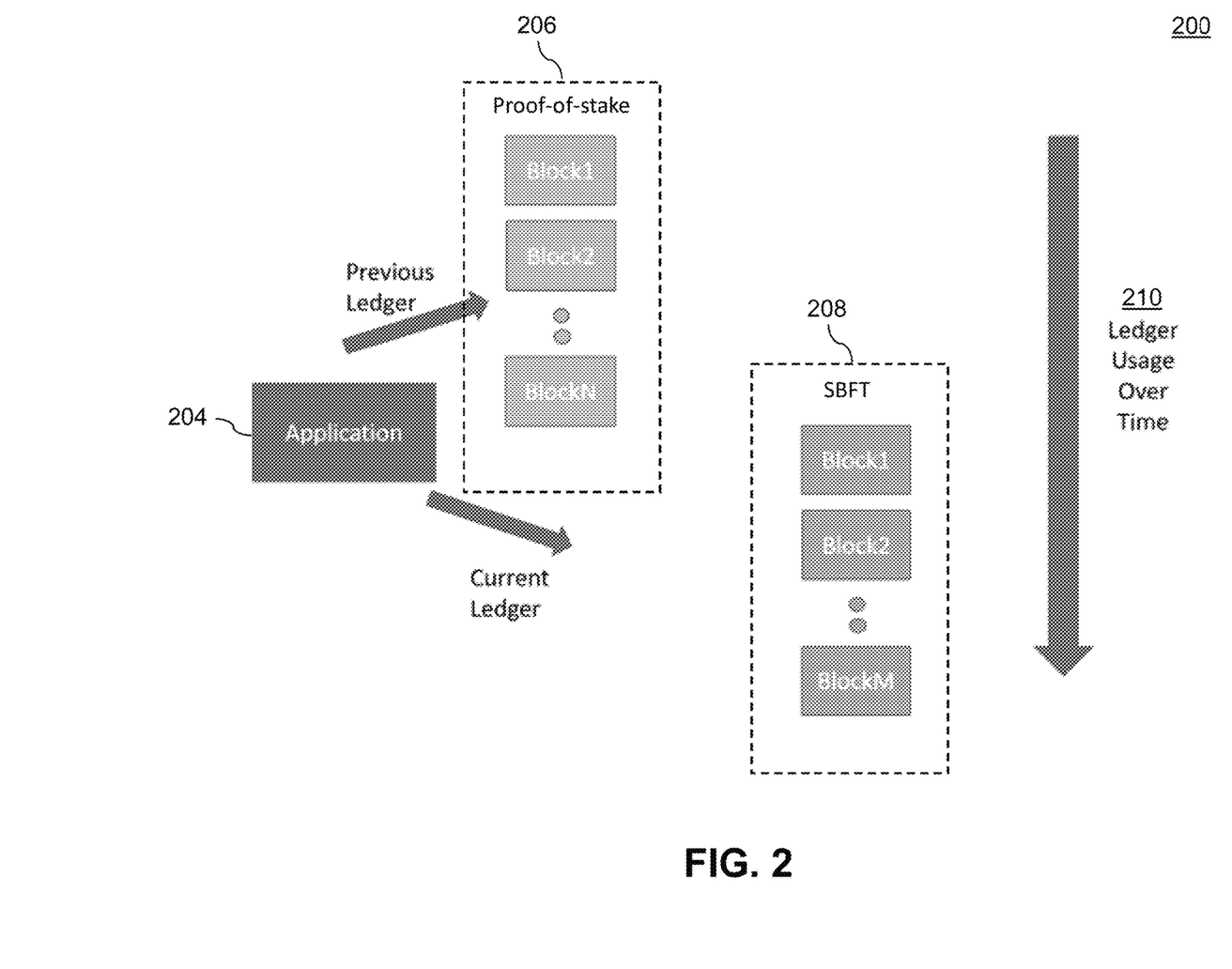
FIG. 2 illustrates an example of historical maintenance of previous digital ledgers.

An application may choose, over time, to forego a given statically-selected consensus algorithm in favor of another statically-selected consensus algorithm. FIG. 2 highlights a digital ledger environment 200 where, for an application 204, a proof-of-stake based ledger 206 (previous or historical ledger) and an SBFT based ledger 208 (current ledger) are separately maintained over time 210. This particular scenario in FIG. 2 has a number of different problems, most notably the need for different APIs to access different ledgers as well as potential transaction format incompatibilities.

Application Elasticity.

Successful applications often increase their instance count to bring business benefits to a company. This increase in elasticity may come with a corresponding increase in the number of blockchain nodes that run the underlying consensus algorithm (the increase in node count may have been unanticipated in the initial requirements). The corresponding increase in the number of nodes may make the historical selection of a consensus algorithm completely inappropriate for the application's new runtime characteristics. For example, a BFT consensus algorithm may have run perfectly well for a blockchain node count of N=8, but perform poorly when the application scales to a level where N=20 (and SBFT may be the better choice). This problem can become increasingly significant when the elastic expansion returns to historical (lower) node counts. If this happens, for example, on a daily basis (e.g., between 9-5 PM on Monday-Friday), then the application will not even have the option of trying to switch over to another consensus algorithm (e.g., the scenario described above in the context of FIG. 2).

Application Modification Over Time.

In an environment of test-driven development and continuous delivery, some applications are updated on a daily (or even hourly) basis. These updates may dramatically change the requirements of the application in terms of the capabilities of the underlying consensus algorithm, and therefore the consensus algorithm may become completely inappropriate for the application's business needs.

Going Public.

An application that has chosen a consensus algorithm which is beneficial for private or community blockchains (e.g., SBFT) may decide to run in a public setting (e.g., the application may wish to participate in the public Ethereum network). Using existing static selection techniques, the application may likely need to switch over to a new consensus algorithm while still maintaining (and offering) a historical view of private ledger activity (e.g., similar to FIG. 2). It is possible that the converse operation may be of benefit as well (e.g., transitioning from a public chain to a private one).

Operation in Mobile Compute Environments.

An application that is deployed in a mobile compute environment (e.g., on a gateway in a connected car) may experience radical fluctuations in application requirements (e.g., which consensus algorithm to use when hundreds of connected cars are located nearby). Executing the wrong consensus algorithm in this type of environment can have damaging business consequences.

Multi-Tenant Applications with Different Requirements.

A business may wish to deploy multiple applications on top of one consolidated blockchain, yet each application may impose different requirements on the same blockchain (e.g., a performance critical blockchain application versus a proof-of-stake requirement). It is currently not possible to mix consensus algorithms in one ledger.

Illustrative embodiments overcome the above and other drawbacks associated with existing consensus algorithm approaches, particularly as they apply to blockchains and other digital ledger systems. For example, one or more illustrative embodiments provide a dynamic consensus selection approach as well as grouping like transactions (e.g., transactions that use the same consensus algorithms) into blocks.

Figure 3:
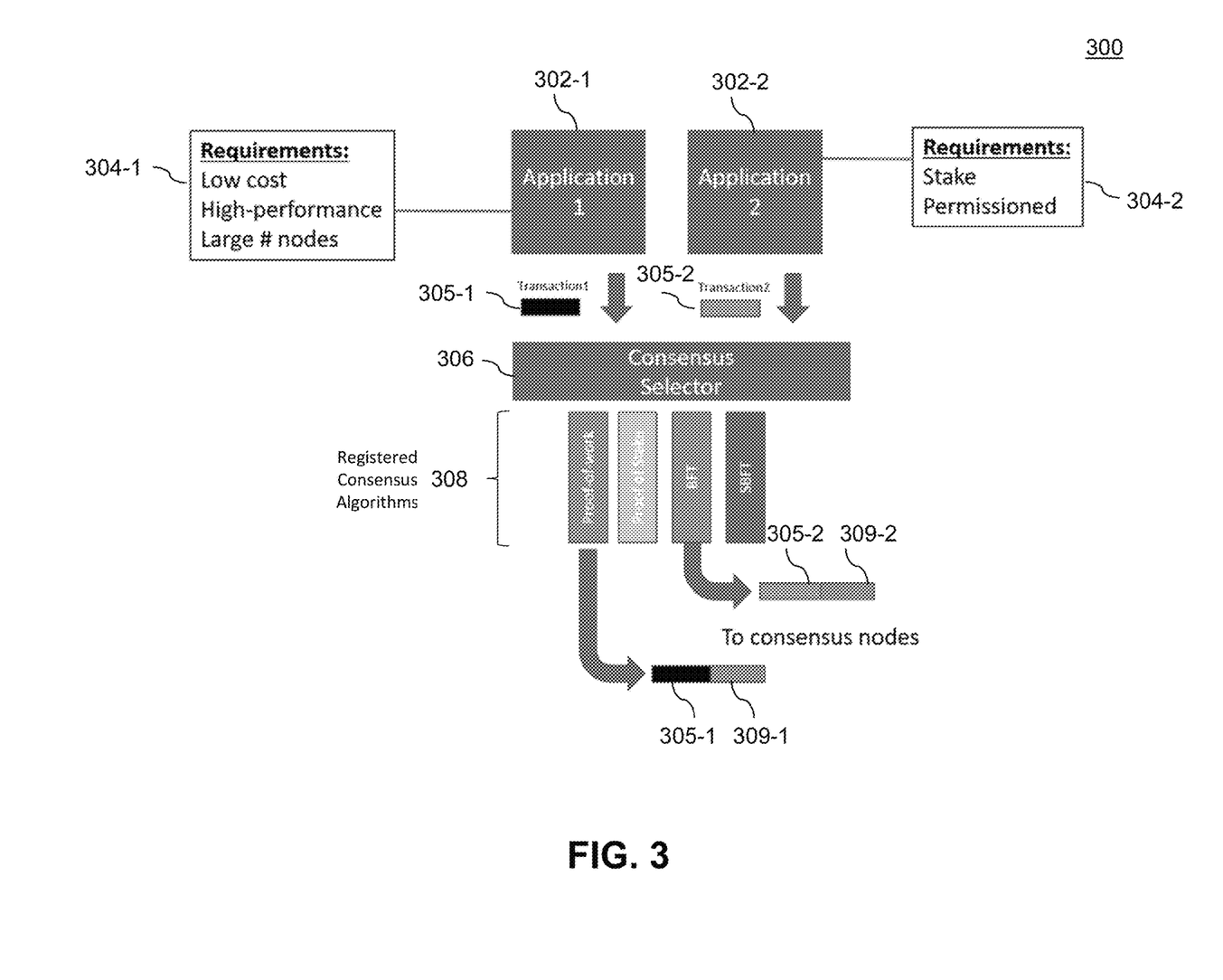
FIG. 3 illustrates policy-driven consensus selection according to an illustrative embodiment.

FIG. 3 illustrates policy-driven consensus selection according to an illustrative embodiment. As shown, system architecture 300 includes multiple applications, e.g., application 302-1 (Application 1) and application 302-2 (Application 2), each having their own application-specific digital ledger requirements. The requirements for each application are referred to herein as an "application policy." For example, application 302-1 has requirements (policy) 304-1 that include low cost, high-performance, and large number of compute nodes. Application 302-2 has requirements (policy) 304-2 that include stake and permissioned criteria. As further shown, each application outputs a new transaction to be validated by at least one of a plurality of consensus algorithms, e.g., application 302-1 generates transaction 305-1 (Transaction1) and application 302-2 generates transaction 305-2 (Transaction2). Each new transaction is provided to a consensus selector module 306 which, as will be explained further herein, dynamically selects a consensus algorithm type from a plurality of consensus algorithms 308 based on the application-specific requirements (304-1, 304-2) of each application (302-1, 302-2). It is to be appreciated that while only one transaction is shown coming from each application in FIG. 3, a given application can provide one or more transactions. The consensus selection process is referred to as "policy-driven" since it is driven by the application-specific requirements. In this illustrative embodiment, the plurality of consensus algorithms 308 comprises a proof-of-work algorithm, a proof-of-stake algorithm, a BFT algorithm and an SBFT algorithm. It is to be understood that a greater or lesser number of consensus algorithms can be part of the plurality of consensus algorithms 308 in alternative embodiments. Also, consensus algorithms other than the ones shown in FIG. 3 can be employed in alternative embodiments.

Based on the consensus algorithm type selected by the consensus selector module 306 for each new transaction (based on its application-specific requirements), each new transaction is tagged with a tag (e.g., field, flag, bit, etc.). Each consensus algorithm (engine) is configured to be able to tag each new transaction. Alternatively or additionally, consensus selector module 306 can tag the transactions. The tag indicates the selected type of consensus algorithm that is to be applied to each transaction by any consensus node to which the new transaction is sent for validation. For example, as shown, transaction 305-1 is tagged with tag 309-1 indicating that proof-of-work consensus is to be applied to this transaction based on the requirements 304-1 for application 302-1. Similarly, transaction 305-2 is tagged with tag 309-2 indicating that BFT consensus is to be applied to this transaction based on the requirements 304-2 for application 302-2. The tagged transactions are then sent (broadcast) to consensus nodes in the network (e.g., consensus nodes 110 in FIG. 1).

In some embodiments, consensus selector module 306 is part of a consensus node on which the plurality of consensus algorithms 308 reside. In other embodiments, consensus selector module 306 may reside on one or more separate compute nodes. Similarly, the applications may run on the same compute node as the consensus selector module 306 or on one or more different compute nodes. Nonetheless, each consensus node that processes a new transaction has access to its own consensus selector module and plurality of consensus algorithms (either residing on same compute node or reachable at another compute node).

There are several advantages to the feature depicted in the system architecture 300. For example, application policies (e.g., requirements 304-1, 304-2) are brought into the consensus selection decision. Further, a consensus selector module (e.g., 306) manages the dynamic consensus algorithm selection process in a multi-consensus execution environment (e.g., 308). Still further, consensus tagging (e.g., 309-1, 309-2) is applied on transaction broadcast. In addition, a multi-consensus ledger data structure is also provided as will be further described below in the context of FIG. 4. These and other benefits and features will be further described below.

Application Policy Mapping to Consensus.

As applications continue to developed to operate with blockchains, illustrative embodiments provide for such applications to be developed with consensus policies (e.g., requirements 304-1, 304-2) as described above. These policies may be specifically coded by the developer, or they may be inferred via code inspection/compilation, or they may be learned over time during an execution. In some embodiments, these policies are passed into smart contracts (see FIG. 1), or in other embodiments they are handed to lower layers of a blockchain stack, e.g., stored in a consensus selection layer described below. Whatever the implementation, applications become associated with their corresponding consensus policies, and these associations are leveraged by the digital ledger framework described herein.

Consensus Selection Via Application Policy (Application-Based Selection).

As a given application begins inserting transactions into a blockchain, the transactions must be validated and agreed upon by peers (consensus nodes) in the network using a consensus algorithm. While existing digital ledger frameworks statically fix one consensus algorithm to a blockchain stack, illustrative embodiments introduce a consensus selection layer that enables the dynamic selection of a consensus algorithm on a per-transaction basis. As a transaction arrives from a given application, the consensus selector module 306 (in the consensus selection layer) performs a lookup that maps the current consensus requirements (e.g., 304-1 or 304-2) of that application to available underlying consensus algorithms (e.g., 308). In the absence of consensus requirements (policy), the consensus selection module 306 chooses a default algorithm (e.g., BFT) in one or more illustrative embodiments.

Consensus Selection Via Inspection (Transaction-Based Selection).

In one or more illustrative embodiments, an alternative (or augmented) approach to consensus selection occurs through an inspection of the transaction itself. Many blockchain transactions have flags or identifying characteristics (e.g., the OP RETURN flag in a bitcoin transaction). If the consensus selection module 306 detects specific types of transactions (e.g., currency transfers, know-your-customer transactions, supply-chain, etc.), these specific transactions are also be routed to an appropriate consensus engine (one of the plurality of consensus algorithms 308).

It is to be appreciated that there may be an interplay between application-based consensus selection and transaction-based consensus selection. As such, in one or more illustrative embodiments, the consensus selector module 306 is configured with a set of criteria for determining which selection has priority.

Multi-Consensus Execution Environment.

In one or more illustrative embodiments, the digital ledger framework allows for different consensus engines to register themselves in a pluggable fashion. The registration process includes a set of consensus capabilities that allows the consensus selection module 306 to perform higher-level mapping operations. Each consensus plug-in has the capability to insert consensus tags (e.g., 309-1, 309-2) during peer-to-peer broadcasting operations.

Consensus Tag Insertion.

For example, as illustrated in FIG. 3, transaction 305-1 is mapped to a proof-of-work consensus algorithm, and the transaction 305-2 is mapped to a BFT consensus engine. In one or more illustrative embodiments, each engine then appends consensus tags to highlight which type of consensus algorithm is being used. These tags are parsed by receiving peer consensus nodes and used to map to the correct consensus algorithm on that node.

Heterogeneous Ledger Consensus Blocks.

Benefits of using the consensus selection layer described above in the blockchain stack become more evident when considering the use case of an application that changes over time and needs a different consensus algorithm. Instead of having to maintain two different blockchains (the multi-ledger problem described above), one ledger is maintained that stores blocks of transactions sorted by consensus algorithms.

Figure 4:
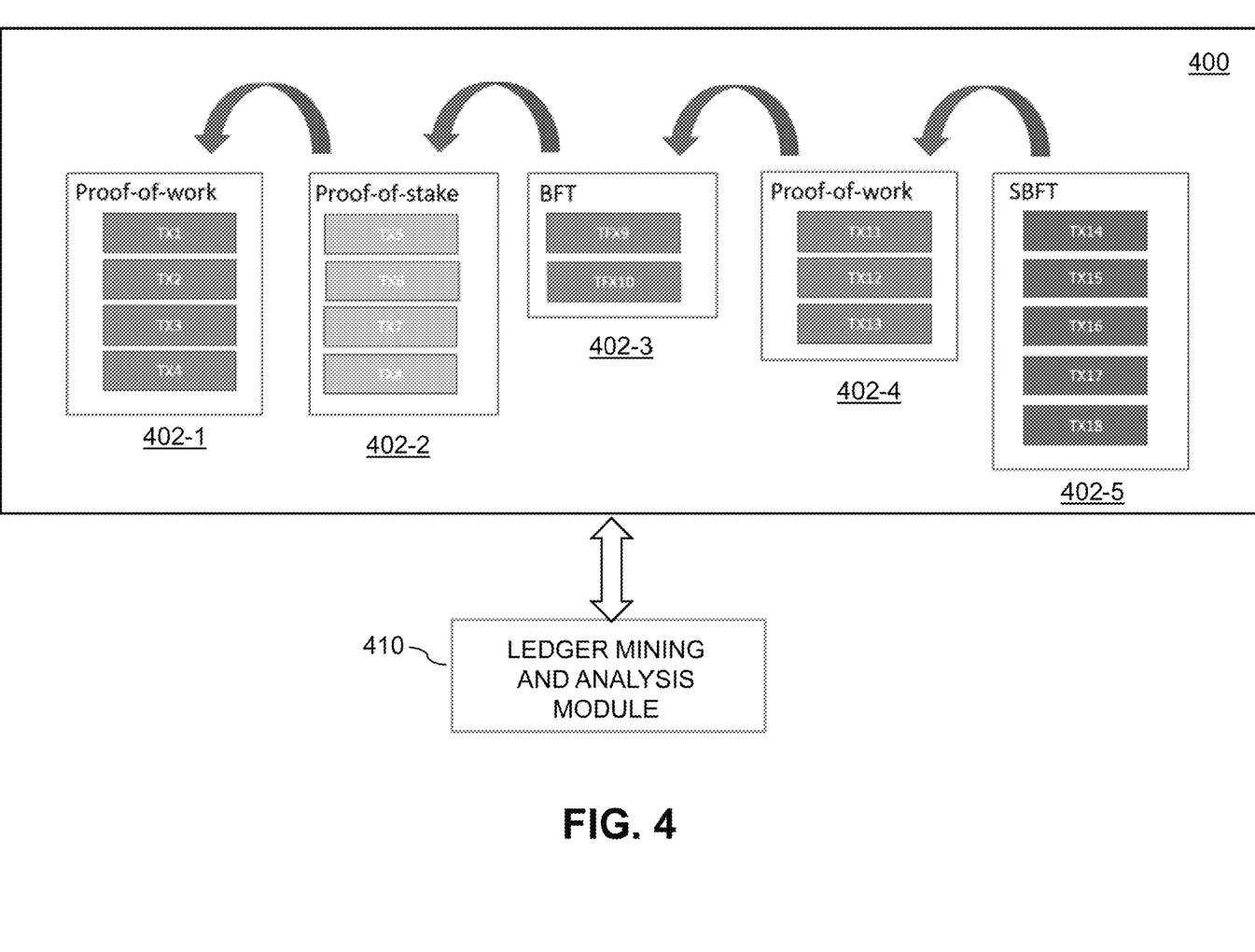
FIG. 4 illustrates a digital ledger with blocks grouped by consensus engine according to an illustrative embodiment.

By way of example only, FIG. 4 illustrates a digital ledger 400 with blocks grouped by consensus engine type according to an illustrative embodiment. As shown, a chain of blocks of the ledger 400 comprises an initial (genesis) block 402-1 with transactions TX1 through TX4 validated by a proof-of-work consensus engine, a next block 402-2 with transactions TX5 through TX8 validated by a proof-of-stake consensus engine, a next block 402-3 with transactions TX9 and TX10 validated by a BFT consensus engine, a next block 402-4 with transactions TX11 through TX13 validated by a proof-of-work consensus engine, and a most recent block 402-5 with transactions TX14 through TX18 validated by an SBFT consensus engine. As illustrated by the arrows, each later block in the digital ledger 400 refers to and incorporates each previous block.

Monitoring of Consensus Benefits.

In one or more illustrative embodiments, the heterogeneous ledger 400 described above is mined and analyzed to understand the benefits of different consensus algorithms that were used by different applications and transactions at different points in time. As shown in FIG. 4, ledger mining and analysis module 410 performs these tasks in one or more illustrative embodiments. By mining and analyzing this historical performance, applications are provided with real-world evidence as to the characteristics provided by underlying consensus algorithms. Not only are blocks labeled by consensus algorithms, but the transactions within those blocks may have additional metadata about the applications, its consensus requirements, time-to-completion, etc. that the mining and analysis module 410 leverages. Among other advantages, the mining and analysis leads to the ability to change a given policy for a given application as well as to change available consensus algorithms that are used to validate future transactions.

Figure 5:
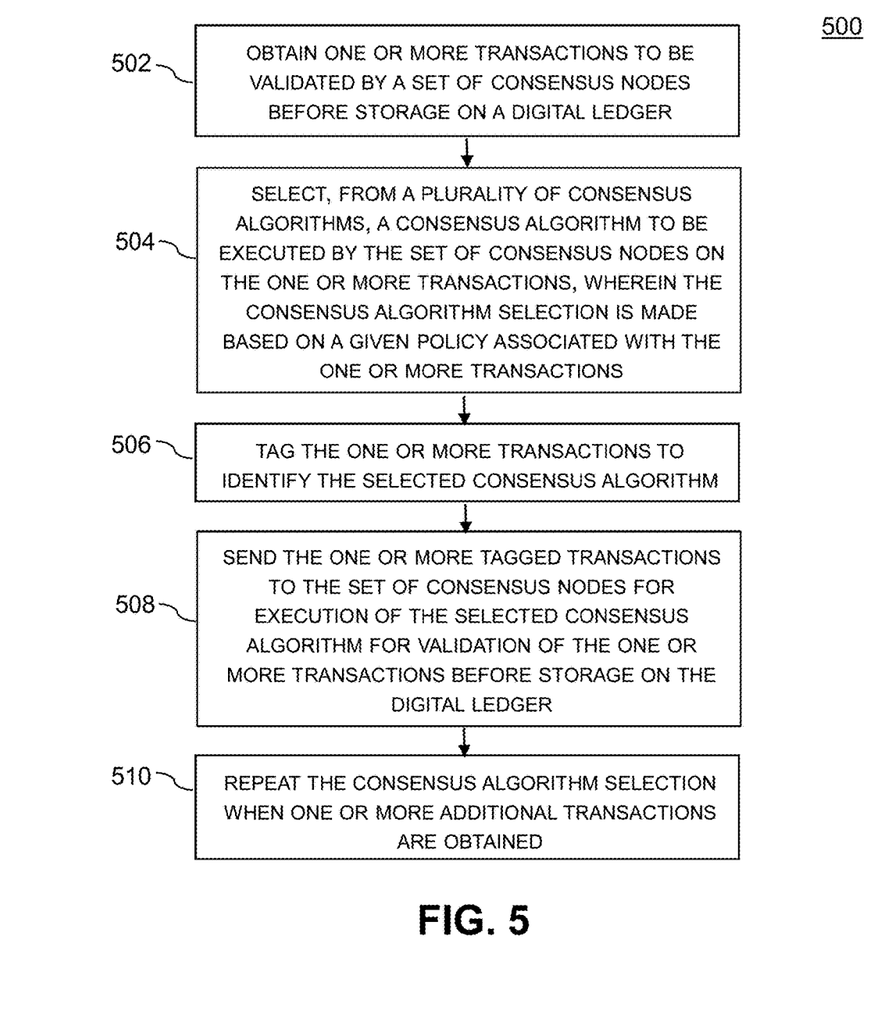
FIG. 5 illustrates a methodology for policy-driven consensus selection according to an illustrative embodiment.

Given the illustrative description of policy-driven consensus selection techniques using a described herein, methodology 500 of FIG. 5 comprises the following steps.

In step 502, the method obtains one or more transactions to be validated by a set of consensus nodes before storage on a digital ledger.

In step 504, the method selects, from a plurality of consensus algorithms, a consensus algorithm to be executed by the set of consensus nodes on the one or more transactions, wherein the consensus algorithm selection is made based on a given policy associated with the one or more transactions.

In step 506, the method tags the one or more transactions to identify the selected consensus algorithm.

In step 508, the method sends the one or more tagged transactions to the set of consensus nodes for execution of the selected consensus algorithm for validation of the one or more transactions before storage on the digital ledger.

In step 510, the selection step is repeated when one or more additional transactions are obtained.

Advantageously, the method performs dynamic per-transaction consensus algorithm selection.

At least portions of the digital ledger system with policy-driven consensus selection shown in FIGS. 1-5 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors. An illustrative embodiment of a processing platform will now be described in greater detail in conjunction with FIG. 6.

As is apparent from the above, one or more of the processing modules or other components of the digital ledger system with policy-driven consensus selection shown in FIGS. 1-5 may each run on a computer, server, storage device or other processing platform element. A given such element may be viewed as an example of what is more generally referred to herein as a "processing device." An example of such a processing platform is processing platform 600 shown in FIG. 6.

Figure 6:
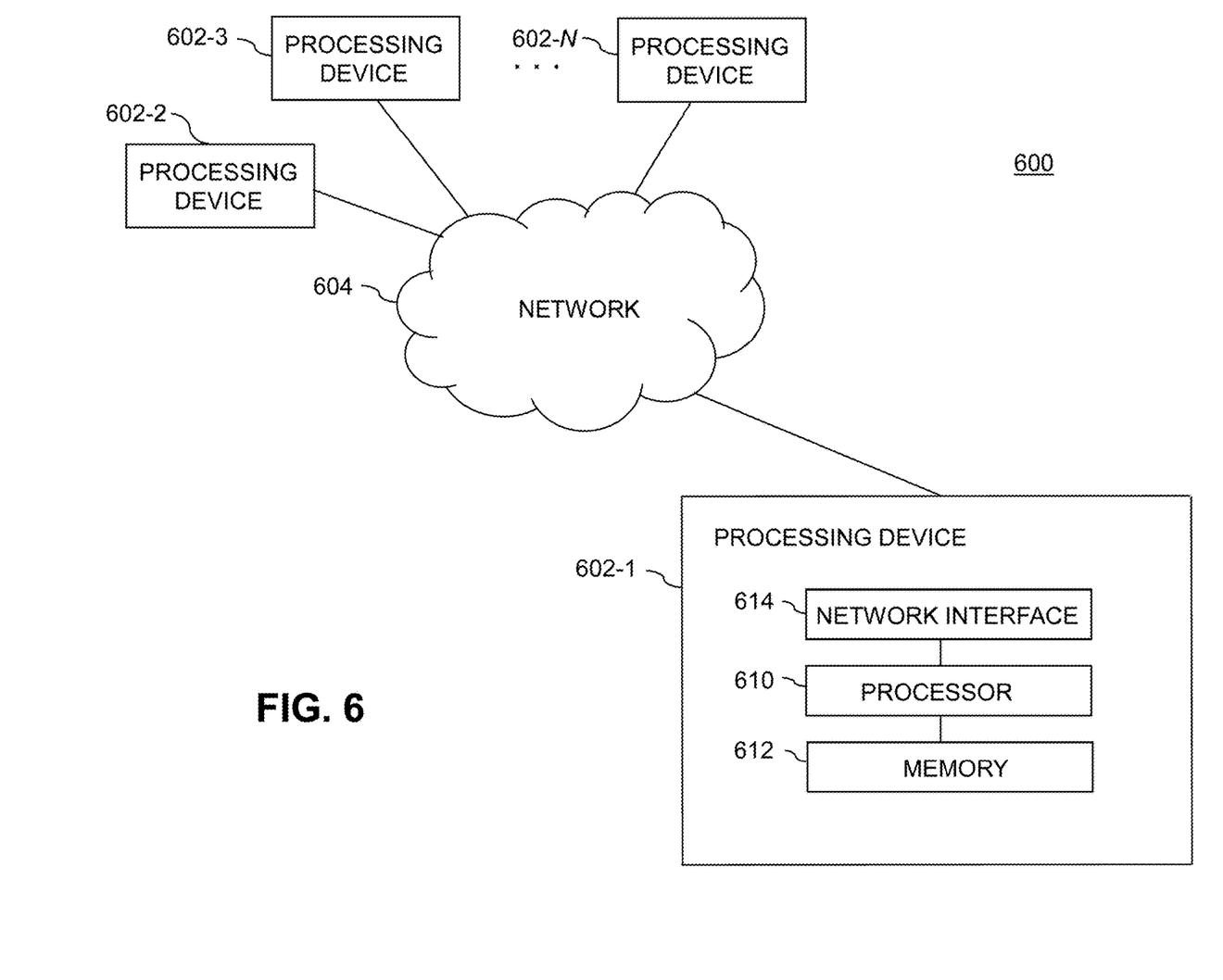
FIG. 6 illustrates a processing platform used to implement a digital ledger system with policy-driven consensus selection according to an illustrative embodiment.

The processing platform 600 in this embodiment comprises a plurality of processing devices, denoted 602-1, 602-2, 602-3, . . . , 602-N, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks. Some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 602-1 in the processing platform 600 comprises a processor 610 coupled to a memory 612. The processor 610 may comprise a microprocessor, a microcontroller, an application-specific integrated circuit (ASIC), a field-programmable gate array (FPGA) or other type of processing circuitry, as well as portions or combinations of such circuitry elements. The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 of the example embodiment of FIG. 6 is network interface circuitry 614, which is used to interface the processing device with the network 604 and other system components and may comprise conventional transceivers.

The other processing devices 602 of the processing platform 600 are assumed to be configured in a manner similar to that shown for processing device 602-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of the digital ledger system, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the digital ledger system with policy-driven consensus selection. Such components can communicate with other elements of the system over any type of network or other communication media.

As indicated previously, in some embodiments, components of the digital ledger system with policy-driven consensus selection as described herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of digital ledger systems. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:
1. A method comprising:
obtaining one or more transactions to be validated by a set of consensus nodes before storage on a digital ledger;
selecting, from a plurality of consensus algorithms, a consensus algorithm to be executed by the set of consensus nodes on the one or more transactions, wherein the consensus algorithm selection is made based on a given policy associated with the one or more transactions;
tagging the one or more transactions to identify the selected consensus algorithm;
sending the one or more tagged transactions to the set of consensus nodes for execution of the selected consensus algorithm for validation of the one or more transactions before storage on the digital ledger;
repeating the selection step when one or more additional transactions are obtained;
analyzing past performance of a given selected consensus algorithm using the digital ledger; and
in response to the analyzing step, at least one of changing the given policy and changing one or more of the plurality of consensus algorithms;
wherein tagging the one or more transactions comprises appending a consensus tag to the one or more transactions;

wherein tagging is performed by the selected consensus algorithm or a compute node that makes the consensus algorithm selection; and wherein the method is implemented via at least one processing device comprising a processor coupled to a memory.

2. The method of claim 1, wherein the repeating step further comprises:

obtaining the one or more additional transactions to be validated by the set of consensus nodes before storage on the digital ledger;

selecting, from a plurality of consensus algorithms, a consensus algorithm to be executed by the set of consensus nodes on the one or more additional transactions, wherein the consensus algorithm selection is made based on a given policy associated with the one or more additional transactions;

tagging the one or more additional transactions to identify the selected consensus algorithm; and sending the one or more tagged additional transactions to the set of consensus nodes for execution of the selected consensus algorithm for validation of the one or more additional transactions before storage on the digital ledger;

wherein tagging the one or more additional transactions comprises appending a consensus tag to the one or more additional transactions; and wherein tagging the one or more additional transactions is performed by the selected consensus algorithm or the compute node that makes the consensus algorithm selection.

3. The method of claim 2, wherein the one or more transactions and the one or more additional transactions are grouped in respective blocks on the same digital ledger based on the consensus algorithm selected for validation.

4. The method of claim 1, wherein the consensus algorithm selection is application program-based.

5. The method of claim 4, wherein the given policy associated with the one or more transactions is coded in an application program that provided the one or more transactions.

6. The method of claim 4, wherein the given policy associated with the one or more transactions is inferred by inspecting an application program that provided the one or more transactions.

7. The method of claim 4, wherein the given policy associated with the one or more transactions is learned over time during execution of an application program that provided the one or more transactions.

8. The method of claim 1, wherein the consensus algorithm selection is transaction-based and wherein the given policy associated with the one or more transactions is determined by inspecting the one or more transactions.

9. The method of claim 1, wherein the given policy associated with the one or more transactions specifies one or more criteria for executing a given consensus algorithm on the one or more transactions.

10. The method of claim 1, wherein in the absence of a given policy associated with the one or more transactions, selecting from a plurality of consensus algorithms a default consensus algorithm to be executed by the set of consensus nodes on the one or more transactions.

11. The method of claim 1, further comprising enabling modification of the consensus algorithms available for selection in the plurality of consensus algorithms.

12. The method of claim 1, further comprising enabling registration of each consensus algorithm available for selection in the plurality of consensus algorithms.

13. An apparatus comprising:

at least one processing device comprising a hardware memory and a physical computer processor coupled to the memory, the memory containing computer program code that, when executed on the processor, causes the apparatus to:

obtain one or more transactions to be validated by a set of consensus nodes before storage on a digital ledger;

select, from a plurality of consensus algorithms, a consensus algorithm to be executed by the set of consensus nodes on the one or more transactions, wherein the consensus algorithm selection is made based on a given policy associated with the one or more transactions;

tag the one or more transactions to identify the selected consensus algorithm;

send the one or more tagged transactions to the set of consensus nodes for execution of the selected consensus algorithm for validation of the one or more transactions before storage on the digital ledger;

repeat the selection step when one or more additional transactions are obtained;

analyze past performance of a given selected consensus algorithm using the digital ledger; and in response to the analyzing step, at least one of changing the given policy and changing one or more of the plurality of consensus algorithms;

wherein tagging the one or more transactions comprises appending a consensus tag to the one or more transactions; and wherein tagging is performed by the selected consensus algorithm or a compute node that makes the consensus algorithm selection.

14. The apparatus of claim 13, wherein the processor is further configured to:

obtain the one or more additional transactions to be validated by the set of consensus nodes before storage on the digital ledger;

select, from a plurality of consensus algorithms, a consensus algorithm to be executed by the set of consensus nodes on the one or more additional transactions, wherein the consensus algorithm selection is made based on a given policy associated with the one or more additional transactions;

tag the one or more additional transactions to identify the selected consensus algorithm; and send the one or more tagged additional transactions to the set of consensus nodes for execution of the selected consensus algorithm for validation of the one or more additional transactions before storage on the digital ledger;

wherein tagging the one or more additional transactions comprises appending a consensus tag to the one or more transactions; and wherein tagging the one or more additional transactions is performed by the selected consensus algorithm or the compute node that makes the consensus algorithm selection.

15. The apparatus of claim 14, wherein the one or more transactions and the one or more additional transactions are grouped in respective blocks on the same digital ledger based on the consensus algorithm selected for validation.

16. The apparatus of claim 13, wherein the consensus algorithm selection is application program-based.

17. The apparatus of claim 16, wherein the given policy associated with the one or more transactions is coded in an application program that provided the one or more transactions.

18. The apparatus of claim 16, wherein the given policy associated with the one or more transactions is inferred by inspecting an application program that provided the one or more transactions.

19. The apparatus of claim 16, wherein the given policy associated with the one or more transactions is learned over time during execution of an application program that provided the one or more transactions.

20. A method comprising:
   obtaining one or more transactions, from one or more application programs, to be validated by a set of consensus nodes before storage on a digital ledger;
   selecting on a per-transaction basis, from a plurality of consensus algorithms, one or more consensus algorithms to be executed by the set of consensus nodes on the one or more transactions based on one or more given policies associated with the one or more application programs;
   sending the one or more transactions, with one or more identifiers of the selected one or more consensus algorithms, to the set of consensus nodes for validation of the one or more transactions before storage on the digital ledger;
   analyzing past performance of a given selected consensus algorithm using the digital ledger; and
   in response to the analyzing step, at least one of changing the one or more given policies and changing one or more of the plurality of consensus algorithms;
   wherein the one or more identifiers comprise at least one consensus tag appended to the one or more transactions;
   wherein tagging is performed by the selected one or more consensus algorithms or one or more compute nodes that makes the one or more consensus algorithm selections; and
   wherein the method is implemented via at least one processing device comprising a processor coupled to a memory.

* * * * *